Figure 1:
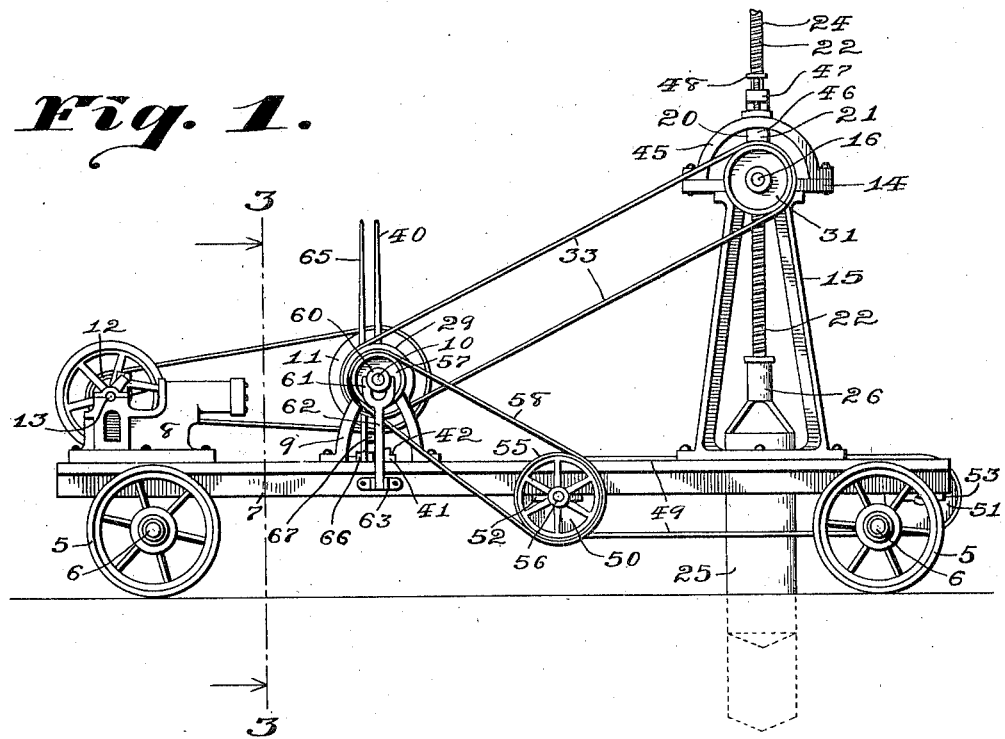

S. L. MARTIN.
BORING MACHINE.
APPLICATION FILED APR. 19, 1912.

1,036,665.

Patented Aug. 27, 1912.
2 SHEETS—SHEET 1.

Witnesses:

Inventor:
Simon L. Martin

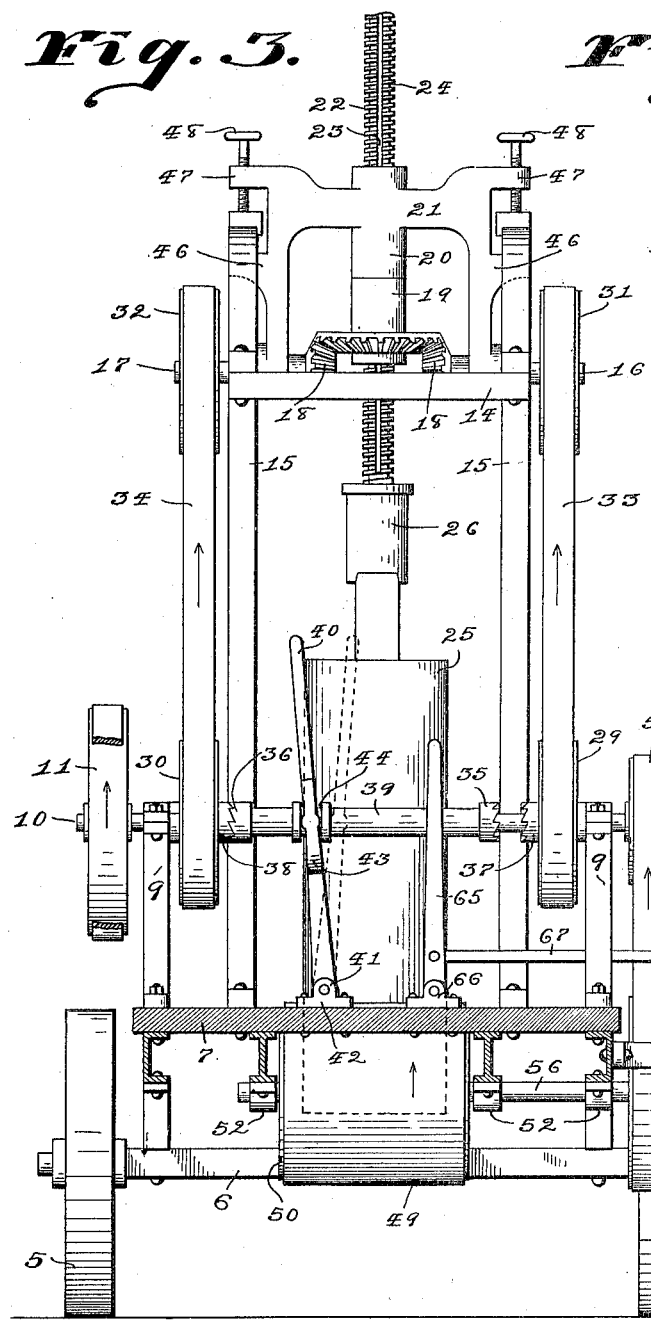
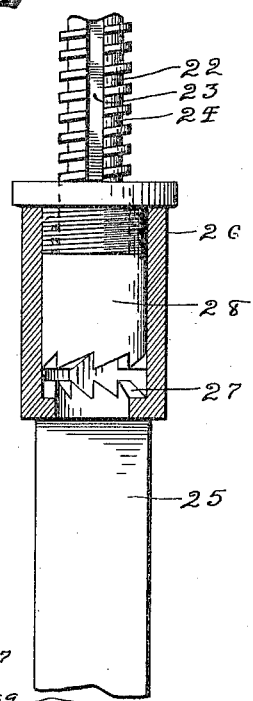

UNITED STATES PATENT OFFICE.

SIMON L. MARTIN, OF OKLAHOMA, OKLAHOMA.

BORING-MACHINE.

1,036,665.     Specification of Letters Patent.     Patented Aug. 27, 1912.

Application filed April 19, 1912. Serial No. 691,868.

*To all whom it may concern:*

Be it known that I, SIMON L. MARTIN, a citizen of the United States, residing at Oklahoma city, in the county of Oklahoma and State of Oklahoma, have invented a new and useful Boring-Machine, of which the following is a specification, reference being had to the accompanying drawings.

This invention has reference to means for drilling or boring, and while the same is applicable to various branches in the art, it may be more particularly adapted for boring openings in ground.

The invention incorporates means for automatically operating a tool and conveying therefrom such matter as has been displaced and expelled thereby.

The invention also incorporates means for suitably operating a tool and a conveyer, if desired, from the same source of power; means for imparting to said tool and conveyer direct and reverse motions,—in the case of the tool for entry and withdrawal thereof, and in the case of the conveyer, for positioning the same for reception of the displaced and expelled borings, and for situating the same in desired and proper positions relatively to the tool, and in connection with these features, means for creating suitable adjustments desirable and necessary in instrumentalities of this character.

An object of the invention is to operate a boring or drilling tool in connection with, and preferably through a conveyer adapted to receive and carry off the materials displaced by and ejected from the tool.

Another object is to automatically advance and retreat the tool from the work, and to adjust the same angularly thereto, or to the perpendicular.

Other objects will become apparent on the further reading of the specification.

The features of the invention may be incorporated in any suitable mechanical embodiment, and may, or may not be, portably arranged. In the present instance, however, the features of invention are arranged in a mechanical structure of the portable type, and while the invention may be, in any wise, suitably operated, the same is illustrated as being associated with an engine of the ordinary reciprocating type, for operating the mechanism, although, as is obvious, within the purview of the invention, any suitable sort of motor may be employed, for operating the device, provided it should be desired to operate the same by power.

In associating the various features of the invention, any suitable form or forms of mechanism may be employed, and in the present instance, there is illustrated, on the accompanying sheets of drawings, forming a part of this specification, a practical mechanism, embodying means for advancing and withdrawing a tool; adjusting the same relatively to the perpendicular, irrespective of the position of a tool-supporting means; a conveyer for receiving the rejected borings; means for operating the same, and various other features, apparent on further inspection of the drawings when viewed in connection with the following specification.

Figure 2:
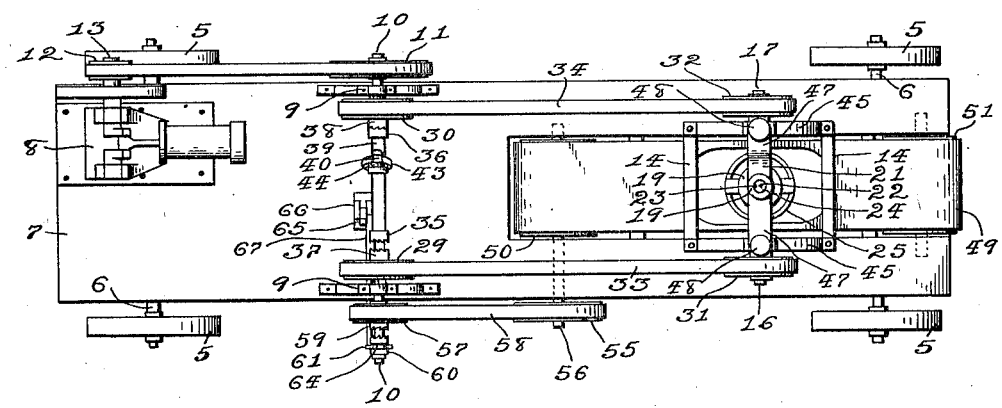

On the sheets of drawings, Figure 1 illustrates a side elevation view of the embodiment above referred to. Fig. 2 illustrates a top plan view of the same. Fig. 3 illustrates a view on the line 3—3 of Fig. 1, illustrating more clearly the assemblage and location of certain elements, and, Fig. 4 illustrates an enlarged detail view of a practical connection, between a tool and means for driving the same.

In the various views, similar characters of reference indicate similar parts.

As already stated, the features of the invention may be supported in any suitable manner, and that, if desired, may be supported portably. In the present instance, they are illustrated as so supported by wheels 5, carried by axles 6, which support a bed 7, supporting, in this instance, a suitable motor or engine, such as ordinary reciprocating engine, designated in a general way by 8, for operating a tool and conveyer, to which reference, more specifically, will later be made.

Operating in suitable bearings 9, supported on the bed 7, is a shaft 10, to which is applied a driven pulley 11, which in the present instance, is driven from a driving pulley 12, mounted on a driving shaft 13 of the engine 8.

Supported in suitably arranged bearings 14, carried, in the present instance, by elevated supports, in the present case, in the form of A-shaped frames 15, are shafts 16 and 17, respectively, each of which is provided with a pinion 18, adapted to mesh with a gear 19, suitably diposed in a bearing 20, which may be supported, for instance, by a framing 21. This gear 19 is so suitably associated with a tool-driving shaft 22, that relative movements may be had between them, and in the present instance, this movement is accomplished through a groove-and-spline connection, the groove being provided in the shaft 22 and indicated by 23. The purpose of this connection is to permit the shaft 22 to be elevated and lowered at will, during the alternate operations of advancing and withdrawing of the tool, which operations may be accomplished in any suitable manner, for instance, by screwthreading the shaft 22 as at 24, and passing the same through the bearing 20, which may be correspondingly screwthreaded to receive the shaft 22. Thus it will be observed that when the gear 19 imparts motion to the shaft 22, the latter will travel in a direction, co-incident to its motion, through its bearing, and thus either advance or retreat a tool 25, of any suitable form, which may be supported and operated by said shaft.

While any sort of a tool may be employed, and may be associated with the tool-driving shaft 22 in any suitable manner, it may be found desirable to allow the tool to remain idle during the reverse and withdrawing operation of the tool shaft 22. Should this be desired, the tool head 26 may be provided with a clutch 27 adapted to coöperate with a corresponding clutch 28 carried by the shaft 22, and the shaft 22 may be mounted, with respect to the tool head, for movement therein so that during the advance or working movement of the tool the clutches 27 and 28, respectively, may coöperate to impart the motion of the tool shaft 22 to the tool 25, and on the reverse motion said clutches may become disengaged, thus allowing the tool to remain inoperative during its retreating motion.

For imparting motion to the tool-driving shaft 22, through the gear 19 and the pinions 18, a pair of idlers 29 and 30, respectively, are mounted upon the driving shaft 10, and these alternately drive two pulleys 31 and 32, carried, respectively, on the shafts 16 and 17, which drive also the pinions 18. The pulleys 29 and 31, respectively, and 30 and 32, respectively, may be suitably connected, for instance, as in the present case, by belts 33 and 34, although any other method of transmission may be adopted within the scope of the invention, for instance, chain drives may be employed.

Mounted on the driving shaft 10, are clutches 35 and 36, respectively, which are designed for alternating engagements with corresponding clutches 37 and 38, respectively, carried by the pulleys 29 and 30, for imparting the motion of the shaft 10 to either pulley 29 and 30. The clutches 35 and 36 may be associated with the shaft 10 in any suitable manner, and may be likewise suitably operated. In the present instance, this is accomplished by providing a sleeve 39 to which the clutches 35 and 36 are connected, and this sleeve is movably associated with the shaft, for an elongated movement thereon, by a groove-and-spline connection, and this sleeve may be, in any manner, suitably operated to shift, alternately, either the clutch 35 or 36 into or out of engagement with the clutches 37 and 38. In the present instance, this sleeve-shifting operation is accomplished by the use of a lever 40 which may be pivoted, as at 41, in a bearing 42, borne on the bed 7, and which is operatively connected with the sleeve, for instance, by having the lever yoked, as at 43, about the sleeve, and maintaining the yoke in an external flanged groove 44, although, obviously, any such other connection as may be practical, may be employed. Thus it will be seen, that in shifting the lever 40 in one direction, the effect will be to drive the shaft 22 in a forward or advancing direction, while shifting the lever in an opposite direction, will cause a reversal, and therefore retreating, movement of said shaft 22.

In the use of the tool, particularly where the bed 7 cannot conveniently be located substantially horizontal, or where it may be desired to bore in angulation to the perpendicular, means are provided for adjusting the tool shaft 22, and its bearings, relatively to the bearings sustaining those bearings. This may be accomplished in any suitable manner, for instance, by providing segmental guides 45 which may be straddled by arms 46 and 47 located at each side of the framing 21, and for the purpose of maintaining any position to which the tool shaft 22 has been adjusted, suitable detaining devices, such, for instance, as set-screws 48, may coöperate with the segments 45, in any suitable manner, either frictionally or otherwise.

During the operation of the tool, in drilling or boring, it is comprehended to automatically provide for the reception of the material displaced and expelled by the tool. This is accomplished, in the present instance, by providing a conveyer 49 in the form of a belt, which passes over two band pulleys 50 and 51, suitably journaled in bearings 52 and 53 carried by the bed 7, and the path of travel of this conveyer is designed to intersect the path of travel of the tool, so that the expelled material from the tool may be deposited on the conveyer. It is comprehended that the expelled matter may be deposited on either side of the conveyer, or be centrally deposited thereon according to the character of the tool employed in connection with the mechanism.

In order to permit the path of travel of the conveyer to intersect the path of travel of the tool, and still avoid interference between the tool and conveyer, the conveyer may be provided with elongated openings 54, which register when the conveyer is properly positioned, and through which the tool passes during its boring operation.

For operating the conveyer, any suitable form of mechanism may be employed. In the present instance, this operation may be accomplished by providing a pulley 55 on a shaft 56, suitably mounted in the bearings 52, and which carries the band pulley 50, and this pulley 55 is operated by a pulley 57, normally operating as an idler on the shaft 10, and which may be connected to the pulley 55 by a belt 58. The pulley 57 is provided with a clutch 59, and a corresponding clutch 60 is movably mounted, as by a pin-and-groove connection, to the shaft 10. The yoke 61, of an arm 62, pivoted to a bracket 63, carried by the bed 7, straddles the clutch, in a groove 64, and this arm is linked to a lever 65, pivoted to a bearing 66, by a link 67. When it is desired to operate the conveyer, the clutch 60 may be brought into engagement with the clutch 59, whereupon the conveyer will move in coincidence with the movement of the driving shaft 10.

It will now be observed that there is provided a combined boring mechanism involving an adjustable tool, and means, involving a conveyer for receiving and conveying the material displaced and ejected by the tool; that the path of the tool intersects the path of the conveyer, and that the tool in its operation passes through the conveyer while the latter remains inoperative. Further, that the tool-operating mechanism and the conveyer-operating mechanism may be driven from the same point of power, if desired, and that the tool may be adjusted for boring through lines intersecting the perpendicular, or be adjusted to the perpendicular when the tool-carrying mechanism would normally locate the tool at an angle to the perpendicular. Again it will be observed that the tool may be automatically advanced and retreated, relatively to the work, through the same means by and through which the tool is operated.

Having thus described the invention, what I claim is:—

1. A boring mechanism comprising a tool, a conveyer for receiving the material displaced and rejected by the tool, and having its path of travel intersecting the path of travel of the tool, and means for operating the tool and conveyer.

2. A boring mechanism comprising a tool, a conveyer for receiving the material displaced and rejected by the tool, and having its path of travel intersecting to the path of travel of the tool, and means for operating the tool and the conveyer.

3. A boring mechanism comprising a tool, a conveyer for receiving the material displaced and rejected by the tool, and having its path of travel intersecting the path of travel of the tool, means for adjusting the tool, and means for operating the tool and the conveyer.

4. A boring mechanism comprising a tool, a conveyer for receiving the material displaced and rejected by the tool, and having its path of travel intersecting the path of travel of the tool, means to adjust the tool angularly relatively to the conveyer, and means to operate the tool and the conveyer.

5. A boring mechanism comprising a tool, a conveyer for receiving the material displaced and rejected by the tool, and having its path of travel intersecting the path of travel of the tool, means for adjusting the tool, means for operating the tool and the conveyer, and means for engaging and disengaging the tool, at will, by the tool-operating means.

Witness my hand this 11 day of April, 1912.

SIMON L. MARTIN.

Witnesses:
NATE LINK,
FERN E. SMITH.

---

Copies of this patent may be obtained for five cents each, by addressing the "Commissioner of Patents, Washington, D. C."